United States Patent
Bray et al.

[19]

[11] Patent Number: 6,117,341

[45] Date of Patent: Sep. 12, 2000

[54] FILTER, APPARATUS INCLUDING THE FILTER AND A METHOD OF USE OF THE APPARATUS

[75] Inventors: David James Bray; Alexander Philip Davidson, both of Warwickshire, United Kingdom

[73] Assignee: Imas Technology Ltd., United Kingdom

[21] Appl. No.: 08/809,754

[22] PCT Filed: Oct. 2, 1995

[86] PCT No.: PCT/GB95/02334

§ 371 Date: Jun. 20, 1997

§ 102(e) Date: Jun. 20, 1997

[87] PCT Pub. No.: WO96/10453

PCT Pub. Date: Apr. 11, 1996

[30] Foreign Application Priority Data

Oct. 1, 1994 [GB] United Kingdom ............... 9419819
Mar. 13, 1995 [GB] United Kingdom ............... 9505038

[51] Int. Cl.[7] .......................... B01D 65/02; B01D 35/06; B01D 61/42; B01D 71/02

[52] U.S. Cl. ............. 210/791; 210/321.69; 210/323.1; 210/483; 210/488; 210/489; 210/503; 210/748; 204/194; 204/267; 204/276; 204/281; 204/409; 204/411; 204/412; 204/419

[58] Field of Search .................... 210/748, 791, 210/321.69, 321.75, 321.84, 323.1, 409, 483, 488, 489, 490, 496, 500.25, 503, 502.1, 506; 204/194, 409, 411, 412, 419, 244, 267, 269, 270, 276, 281, 747, 748; 205/746, 747, 748, 751, 770; 134/1

[56] References Cited

U.S. PATENT DOCUMENTS 4,888,114 12/1989 Gaddis et al. ................ 210/500.25
5,186,833 2/1993 Mchenry et al. ............... 210/321.75
5,364,586 11/1994 Trusov et al. .................. 419/2
5,571,413 11/1996 Mogami et al. ................ 210/489
5,716,526 2/1998 Kelemen et al. ............... 210/490
5,716,527 2/1998 Deckman et al. .............. 210/490
5,772,735 6/1998 Sehgal et al. ................... 210/490

FOREIGN PATENT DOCUMENTS 0165744 12/1985 European Pat. Off. .
0344961 12/1989 European Pat. Off. .
0380266 8/1990 European Pat. Off. .
2642984 12/1988 France .
2160545 12/1985 United Kingdom .
2267838 12/1993 United Kingdom .
WO9505256 2/1995 WIPO .

OTHER PUBLICATIONS

Future Industrial Prospects of Membrane Processes by Cecille and Toussaint, Elsevier Applied Science, London and New York, pp. 76–94 (undated).

*Primary Examiner*—John Kim
*Attorney, Agent, or Firm*—Reising, Ethington, Barnes, Kisselle, Learman & McCulloch, P.C.

[57] ABSTRACT

A filter has a first filter layer made of $TiO_2$ of $Ti_4O_7$ particles deposited on a second filter layer by stainless steel particles. The first layer has a smaller pore size than the second layer. The construction of the filter, the relative thicknesses of the layers and the resistances thereof to movement therethrough of electrolytically generated gas located between the two layers when the filter is permeated with liquid are such that the gas reaches the upstream side of the filter before the downstream side. In one embodiment stainless steel particles are sintered and rolled with a textured roller before ceramic particles are applied and rolled. An intermediate layer of metal particle peaks and ceramic filled troughs is thus provided which has high tortuosity. The resistance to flow at the metal/ceramic interface can be increased by electrodeposition of metal there.

38 Claims, 11 Drawing Sheets

FILTER, APPARATUS INCLUDING THE FILTER AND A METHOD OF USE OF THE APPARATUS

The invention relates to a filter, apparatus including the filter and a method of use of the apparatus.

BACKGROUND OF THE INVENTION

Filters are known for filtration at different particle size levels. Filtration at a very fine particle size level is required for example in the treatment of beer for clarification, in the treatment of chemical effluent and in particular in the treatment of water to remove, for example, bacteria.

Many conventional membrane filtration processes for fine particle size filtration of liquids rely on high velocity cross flow to induce turbulence in the feed and reduce the thickness of the laminar flow boundary layer along the membrane surface. In this way, the rate at which the "filter cake" builds up is reduced, and the transmembrane flux may be kept higher than would otherwise be the case. Nevertheless, the typical transmembrane flux to be expected for any form of membrane when used for real feeds is ~100 l/hr/m$^1$/Bar, compared with pure water flux of a typical polymer of organic microfiltration membrane in the range ~1000–10000 l/hr/m$^2$/Bar. Therefore, not only are all types of microfiltration membranes used at <10% of their theoretical efficiency, a lot of power input is wasted in doing it.

The direct membrane cleaning process developed by AEA Technology, Harwell, and described in GB 2160545 relies on the generation of hydrogen bubbles at the surface of an electrically-conducting, cathodically-charged, porous membrane to break up the filter cake. In this way, it is possible to maintain transmembrane fluxes approaching the value to be expected for pure water. Inorganic membranes typically cost at least five times as much as organic membranes. If the transmembrane flux for an inorganic membrane can be increased significantly by use of this process, not only does it become more cost effective, because the filtration area will be much smaller, but the running costs may also be less because high cross flow velocities may not be required.

The process of GB 2160545 uses sintered metal membranes. These have pore sizes in the range of 1 micrometre, so do not reject bacteria and such like micro-organisms and cannot be used for many critical processes of commercial interest. Carbon membranes can be obtained with a wide range of pore sizes. However, as most are in the form of tubes, they would need either a coaxial wire anode, or an external tube anode to be used in the electrolytic process. These membranes tend to be flexible and so would have to be short to maintain the correct anode-cathode distance. Also, it would be much more difficult to develop good enough electrical contact. These factors would increase considerably the engineering cost of such a filter module.

One known membrane which is made by the Ultram Company comprises a flat, sintered-metal substrate with a pore size of approximately one micrometer and, with a smaller pore size, ceramic, final filtration layer. The latter is usually kept as thin as possible because the materials from which it is made are expensive. Nevertheless, the small pore sizes are required for the membrane to reject bacteria. It is known to clean this filter by the use of back pressure.

SUMMARY OF THE INVENTION

According to one aspect of the invention there is provided a filter comprising a first, less electrically conductive filter layer and a second, more electrically conductive filter layer downstream thereof, the first layer having a smaller pore size than the second layer, the construction of the filter, the relative thicknesses of the layers and the resistances thereof to movement therethrough of electrolytically generated gas located between the two layers when the filter is permeated with liquid being such that such gas reaches the upstream side of the filter before the downstream side.

In this way, filters of the general construction of the known Ultram membranes described above can be electrolytically cleaned, as at least some gas electrolytically generated at the surface of the conductive layer will pass through the non-conductive layer to the upstream surface of the filter to clean away the filter cake.

The pore size of the less electrically conductive layer may be no more than 10 μm, or no more than 2.5 μm, preferably no more than lam, most preferably no more than 0.5 μm. Preferably, the less conductive layer has a pore size sufficient to reject bacteria.

The filter may be constructed with a further layer such that gas passes to the upstream side of the filter before the downstream side.

In a preferred embodiment the filter includes an intermediate layer between the first and second layers, the intermediate layer being more electrically conductive than the first layer and with resistance to flow similar in magnitude to the first layer or greater than the first layer. In this way, gas can be electrolytically produced at the junction of the intermediate layer and the first layer and may experience lower resistance to flow by passing through the first layer. The thickness of the intermediate layer and its resistance to flow may not be so high as to have a large effect on flow through the filter in normal use.

The intermediate layer may comprise a composite of a more electrically conductive material and a less electrically conductive material. The porosity of the intermediate layer may be 0.1 to 50% lower than the porosity of the first layer. The resistance to flow is effective at 0.1% increased porosity while at 50% increased porosity the reduction in maximum flow rate through the filter is beginning to affect performance. The volume fraction of the more electrically conductive material in the intermediate layer may be highest adjacent the second layer. Conveniently, the more electrically conductive material of the intermediate layer may be the same material as that of the second layer and the less electrically conductive material of the intermediate layer may be the same less electrically conductive material as that of the first layer. This may assist in bonding of the three layers and reduce relative thermal expansion stresses.

The intermediate layer may comprise a composite of larger particles and smaller particles. Where the first layer is made of small particles of a uniform size, the use of small and large particles in the intermediate layer will provide the desired increased flow resistance. The larger particles may be made of a more electrically conductive material and the smaller particles may be made of less electrically conductive material. The more conductive particles may be present in the form of isolated particles or as clusters of particles in the range 50 to 2500 particles or clusters per square millimetre of the intermediate layer in plan, preferably 100 to 2500 mm$^{-2}$ most preferably 250 to 2500 mm$^{-2}$. From 250 mm$^{-2}$ and above a significant improvement in performance is seen. The intermediate layer may alternatively comprise particles in a porous matrix. The particles may be made of a less electrically conductive material and the matrix may be made of a more electrically conductive material.

The first layer may be made from substantially non-conducting material. The first layer may be made of ceramic such as an oxide of titanium e.g. titanium dioxide. The ceramic may be a ceramic with high electrical conductivity such as $Ti_4O_7$. The second layer may be made of a material which is a good conductor and may be made of metal such as stainless steel.

In another embodiment, the first and second layers may be provided directly on one another, the thickness of the second layer in relation to the first layer ensuring that electrolytically generated gas reaches the upstream side of the filter first.

In a further embodiment, the filter may comprise a further layer of increased flow resistance downstream of the second layer. The further layer may be made from the same material as the first layer.

According to another aspect of the invention there is provided apparatus comprising a filter according to the first aspect of the invention and an opposite electrode to enable electrolysis with the filter acting as a further electrode.

The apparatus thus comprises the filter and the means to clean it. The cleaning may be conducted in the same way as described in GB 2160545.

Preferably, the apparatus further includes pulse means to provide pulsed power to the electrodes. The use of a sufficient voltage to produce a current density causing a good level of gas to be generated is needed. This power will be lower than in the apparatus of GB 2160545 and also need be applied for a shorter time, resulting in a more economical filtration process.

The electrode may take any suitable form and may comprise a plate or mesh to be arranged parallel to the filter surface. Preferably the opposite electrode is arranged to apply a potential difference to parts of the filter sequentially. Indeed according to a further aspect of the invention there is provided a filter apparatus comprising a filter having at least one conductive layer and an opposite electrode, the opposite electrode being arranged to apply a potential difference to parts of the conductive layer of the filter sequentially. The width of the opposite electrode may be substantially smaller than the filter surface and the apparatus may further include means for moving the opposite electrode over the filter surface. In another embodiment, the opposite electrode may comprise a flexible sheet and means to manipulate the sheet to bring each part of the sheet sequentially close to and away from the filter surface. The manipulating means may comprise means for sending a wave across the sheet.

In the second aspect of the invention the filter apparatus may comprise a plurality of filter modules and a plurality of electrode modules, each filter module including the said filter with the more conductive layer being connected to an electrical supply, each electrode module comprising the said opposite electrode, each module being bounded by a frame, the filter and electrode modules being arranged alternatively side by side and the frames secured together in a substantially liquid tight manner.

Indeed, according to a further aspect of the invention there is provided a filter apparatus comprising a plurality of filter modules and a plurality of electrode modules, each filter module comprising a filter having a conductive layer connected to a power supply, each electrode module comprising at least one electrode element, each module being bounded by a frame, the filter and electrode modules being arranged alternatively side by side and the frames being secured together in a substantially liquid tight manner.

The filter apparatus can thus be provided in a very compact fashion and the modular also form simplifies manufacture.

Preferably, the frames are of common plan outer dimensions.

Each electrode module preferably comprises a plurality of electrode plates arranged in a substantially co-planar fashion. Each electrode plate is preferably 250 to 400 $cm^2$ in area. This enables European mains power supply to be used.

Each electrode module preferably comprises at least one electrode element to one face of the frame and at least one electrode element to the opposite face of the frame. This facilitates the movement of liquid into and out of the module and also reduces cost by enabling thinner elements to be used. The electrode elements to each face of the frame may be connected through a connecting member between the electrode elements the connecting member being connected to an electrical supply.

Preferably, a leak path is provided between two module frames from internally of the frames on the input side of the filter to externally of the frames. The leak path ensures that if a leak should occur from the input to the output side of the filter, leakage will take place preferentially along the leak path provided between the two module frames as that leak path leads to atmosphere whereas any leak to the output side of the filter would be to a pressure above atmospheric pressure due to the back pressure from resistance further through the filter apparatus. The leak path may conveniently comprise a groove or rebate in at least one of two side by side frames. The membrane periphery in the region of the seals will itself be sealed to prevent leakage through the membrane.

The filter of each filter module is preferably a filter according to the first aspect of the invention.

Each filter module preferably comprises a filter membrane covering each open side of the frame. Each filter membrane is preferably provided on a perforated support which may be a gauze. The said perforated support is preferably electrically conducting. The said perforated support may be provided on a second support which defines fewer, larger perforations. The second support is preferably electrically conducting. Preferably, a resilient member is provided between the filter membranes. The resilient member may be corrugated. The resilient member may be electrically conducting or may be made from plastics.

One electrode module suitably includes an input for fluid to be filtered and the electrode modules can be linked in parallel or in series. In this way, the apparatus can be used with a constant throughflow of fluid to be filtered, or alternatively can be used as a series dead end system. In the dead end, series arrangement, the solid material in the fluid to be filtered will tend to accumulate at the dead end and preferably the last electrode module in the series includes a valve to allow continuous or intermittent dumping of accumulated solid material.

According to another aspect of the invention there is provided a method of cleaning a filter using apparatus according to the second, third or fourth aspects of the invention, the method comprising applying potential across the electrodes.

According to a further aspect of the invention there is provided a method of making a filter membrane comprising depositing material at an interface in a body comprising a first less electrically conductive filter layer and a second more electrically conductive filter layer the interface being defined between the layers, the first layer having a smaller pore size than the second layer, the material being more electrically conductive than the first layer.

The deposition is conveniently carried out by electrodeposition, hydrometallurgy or electroless plating.

According to another aspect of the invention there is provided a method of making a filter membrane comprising passing a current across two electrodes in an electrode bath, a first electrode comprising a body comprising a first less electrically conductive filter layer and a second more electrically conductive filter layer, the first layer having a smaller pore size than the second layer and the method being such that electrodeposition takes place at the interface between the layers.

The second electrode may be the anode.

The electrodeposition at the interface between the layers will cause the formation of a region of reduced porosity. Preferably, the method is a method of making a filter according to the first aspect of the invention. Thus, the electrodeposition results in the aforesaid intermediate layer being formed.

The electrolyte may be a simple electrolyte, or may be a bright electroplating electrolyte.

An advantage of electroplating at the interface is in binding the two filter layers together by means of the electrodeposited material. The said second layer of the body may comprise a layer of particles, e.g. rolled particles, onto which the first layer is deposited. The method is particularly useful in this situation where the powder rolled second layer has a flat surface onto which the first layer may not adhere well without such treatment. Alternatively, the body may comprise a second layer of particles, e.g. powder rolled particles with further similar particles fixed to the surface onto which the first layer is subsequently deposited. The body may comprise the titanium dioxide/stainless steel filter currently made by the Ultram Company.

According to a further aspect of the invention there is provided a method of making a filter membrane comprising providing a second filter layer, texturing the surface of the layer and forming a first filter layer onto the textured surface.

According to a further aspect of the invention there is provided a filter comprising an upstream surface made from $Ti_4O_7$.

THE DRAWINGS

Embodiments of the invention will now be described by way of example and with reference to the accompanying drawings, in which.

DETAILED DESCRIPTION

Figure 1:
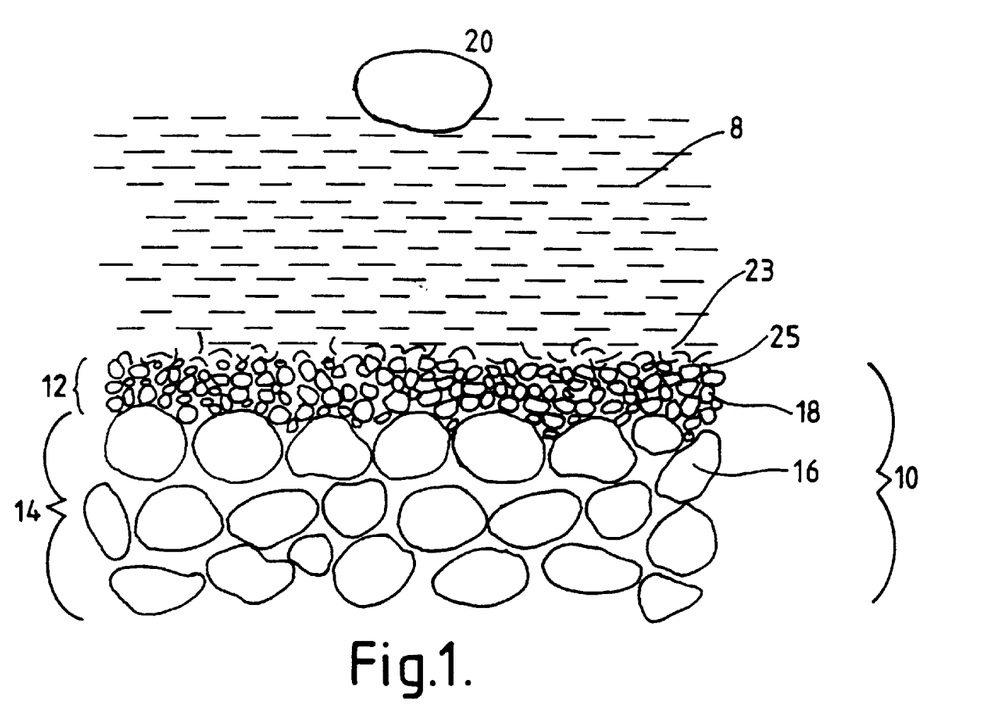
FIG. 1 is an elevation in cross-section of a filter in a first embodiment of the invention.

The filter membrane 10 of FIG. 1 comprises a first layer 12 of titanium dioxide ceramic particles provided on a flat, second, substrate layer 14 forming upstream and downstream sides of the filter membrane 10 respectively. The second layer 14 is made of sintered particles 16 of stainless steel. The ceramic particles 18 are finer than the sintered metal particles 16 to provide a smaller pore size. In normal use, the liquid 8 to be filtered flows through the filter membrane 10 from the ceramic layer 12 to the metal sintered layer 14 and filter cake 23 builds up on the ceramic layer 12. In order to clean the filter 10, the sintered metal layer 14 is connected to a power supply (not shown) which is also connected to an elongate electrode 20 which is shown in transverse cross-section in FIG. 1. The power supply provides pulses of electrical current between the filter 10 and the electrode 20, the filter 10 being the cathode. The liquid 8 may be an aqueous solution. Hydrogen will thus be generated at the boundary between the sintered metal substrate 14 and the ceramic layer 12.

The sintered metal layer 14 is a good electrical conductor and, when it is made the cathode of an electrochemical cell, hydrogen will be generated on the surface of the metal particles 16 nearest the anode 20. It does not matter than the hydrogen is generated below the membrane surface when it has a superficial layer of non-conducting particles 18, only that sufficient hydrogen emerges from the upstream surface.

Three factors are important:

(1) Where the gas bubbles are nucleated.

(2) The pressure in the gas bubbles needed to force fluid to flow through the pores.

(3) The side of the membrane 10 from which the bubbles of hydrogen emerge.

The pressure difference, Δp, of the gas inside a spherical gas bubble in a fluid is given by Young's equation:

$$\Delta p = 2\Gamma/r \qquad (1)$$

Figure 2:
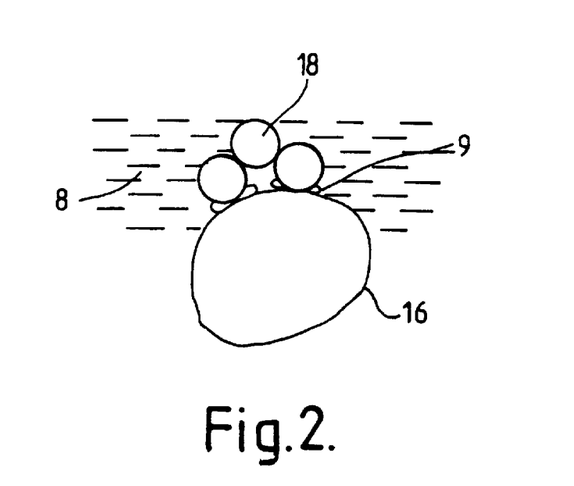
FIG. 2 is a detailed view of the elevation of FIG. 1 showing hydrogen initiation points.

Γ is the surface tension of the fluid with respect to the gas, r is the radius of the bubble When the radius is very low, Δp becomes very high. If the gas nucleates in a cavity, there is less gas/fluid surface. The pressure needed to form the bubble nucleus is then less than it would be for a hemispherical cap on a flat surface. Therefore, the most likely place where bubbles of hydrogen 9 will form is where the small ceramic particles 18 touch the larger metal particles 16, see FIG. 2. This is at the interface between the two layers 12,14 and is also the position nearest the anode 20, therefore with lowest solution resistance for passage of ions across the anode-cathode gap.

The hydrogen 9 will preferentially fill the part of the membrane 10 with least capillary pressure. This, from (1), will be that with largest pore size, the substrate 14. If the hydrogen 9 is produced at a low enough rate such that its pressure is always below the capillary pressure of the small pore size layer 12, the hydrogen 9 will all emerge from the downstream surface of the membrane 10 and will serve no useful purpose. Until the first bubble emerges from the downstream surface, the pressure within the substrate 14 will be between the capillary pressure of the substrate 14 plus the downstream pressure and the capillary pressure of the first layer 12 plus the upstream pressure. When bubbles are produced the pressure within the substrate 14 will oscillate within this range, see FIG. 3.

If the hydrogen is to be used to force the filter cake from the surface of the small pore size layer 12, its pressure must be increased to at least the capillary pressure of that layer 12 plus the pressure in the upstream chamber. This can be done without modifying the membrane 10 in two ways. The first is to close off the chamber behind the filter with e.g. a solenoid valve. The hydrogen gas pressurises the chamber. There are four disadvantages. The first is that the filter membrane is bi-axially stressed, and may fail mechanically. The second is that it may lift off the supporting structure and lose electrical contact with it. The third is that only a small proportion of the hydrogen will emerge from the upstream surface, giving rise to low electrical efficiency. The fourth is that the cathode filter may bow so far as to touch the anode and cause a short circuit. The second way to do this is to increase the hydrogen production rate significantly, by using a high current pulse, so that the back pressure generated by the resistance to flow of the permeate fluid through the substrate 14 to the downstream surface of the membrane 10 is high enough to force some of the hydrogen to the upstream membrane surface. However, before bubbles emerge from the upstream surface, it is necessary first to displace the fluid in the small pores which will also contribute to removal of filter cake. Furthermore, this fluid must b e displaced before the fluid is displaced through the substrate 14. Two factors are important here; the pore radii and the pore lengths.

The Hagen-Poisseuille equation gives the volumetric flow-rate through a capillary of length l, radius r, tortuosity τ, of a fluid with viscosity $\varrho$ under a pressure drop p:

$$\frac{dv}{dt} = \frac{\Delta p r^4 \pi}{8 v \tau l} \quad (2)$$

Assuming constant pressure and neglecting kinetic energy, the instantaneous velocity of the hydrogen-fluid interface in the capillary is obtained by dividing the flow-rate by the area of the capillary. Integration of the equation shows that the tube will become empty at a time given by:

$$t = \frac{8 v \tau l^2}{\Delta p r^2} \quad (3)$$

Δp in this case is the difference between the internal pressure of the hydrogen and the capillary pressure plus static pressure, so the net pressure driving fluid through the small pore size region is much less than that driving fluid through the substrate 14. Therefore, to ensure that the hydrogen breaks through the small pores first the thickness of the small pore size region 12 needs to be decreased or the thickness of the substrate 14 needs to be increased to appropriate relative sizes. The former is more difficult than the latter. However, since the cost of metal powder/fibre is a significant part of the overall substrate product cost, this approach may be less attractive from the point of view of cost. If the membrane is modified in such a way the following advantages will accrue: lower stress, better electrical contact, higher electrical efficiency, and it is not necessary to clean all of the filter at once.

Figures 3, 4:
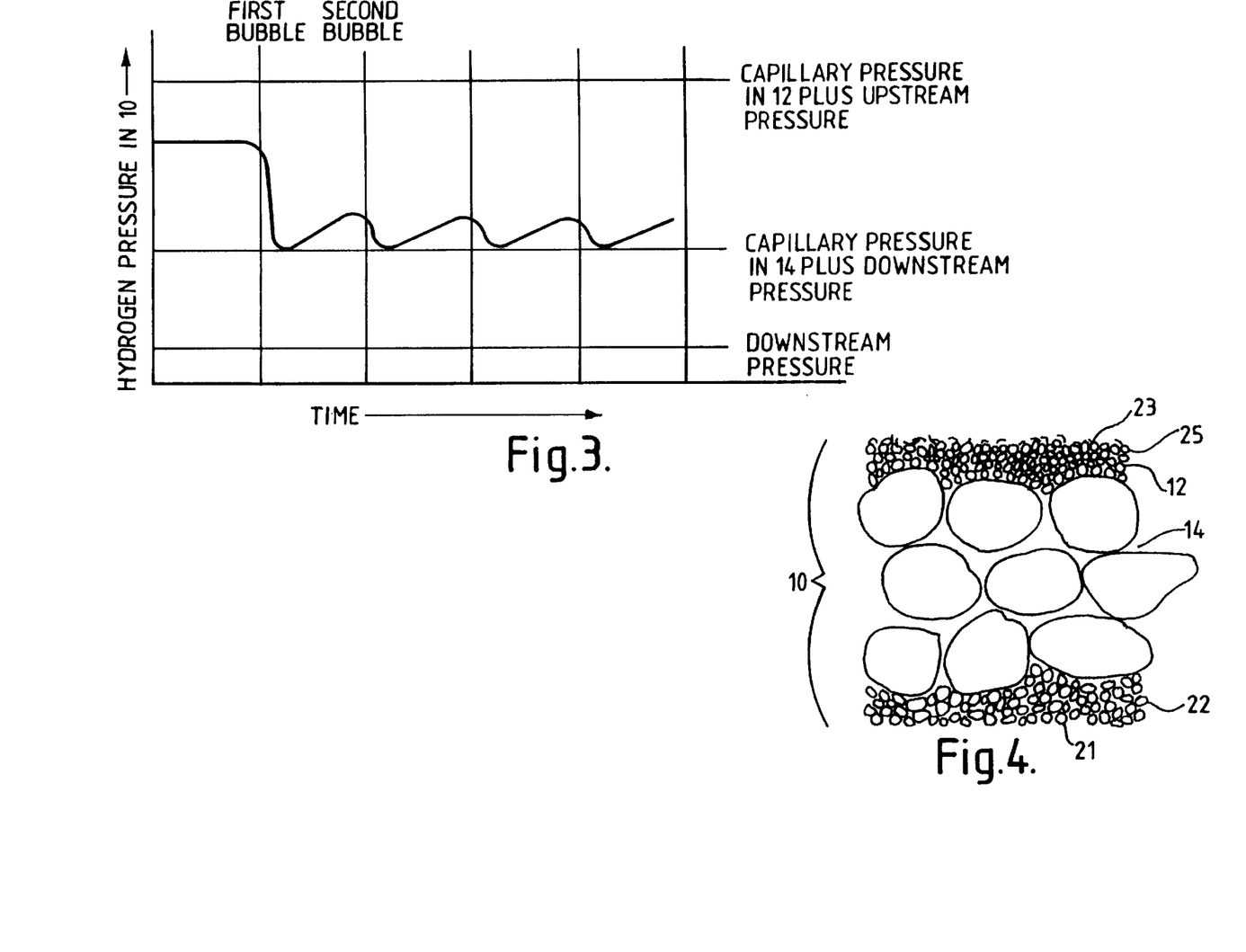
FIG. 3 is a graph of pressure against time during bubble formation within the filter of FIG. 1.
FIG. 4 is an elevation in cross-section of a filter in a second embodiment of the invention.

In the embodiment of FIG. 4, the membrane is symmetrical, and there is a small pore-size layer 12,22 on both sides of a sintered metal layer 14. The upstream layer 12 being thinner than the downstream layer 22. In this case, when the hydrogen is generated, the whole of the interior 14 of the membrane 10 is pressurised at least to the capillary pressure of the upstream small pore-sized layer 12 plus the upstream pressure. Hydrogen will reach the upstream surface 25 of the membrane 10 first, as the upstream layer 12 is sufficiently thinner than the downstream layer 22.

Figure 5:
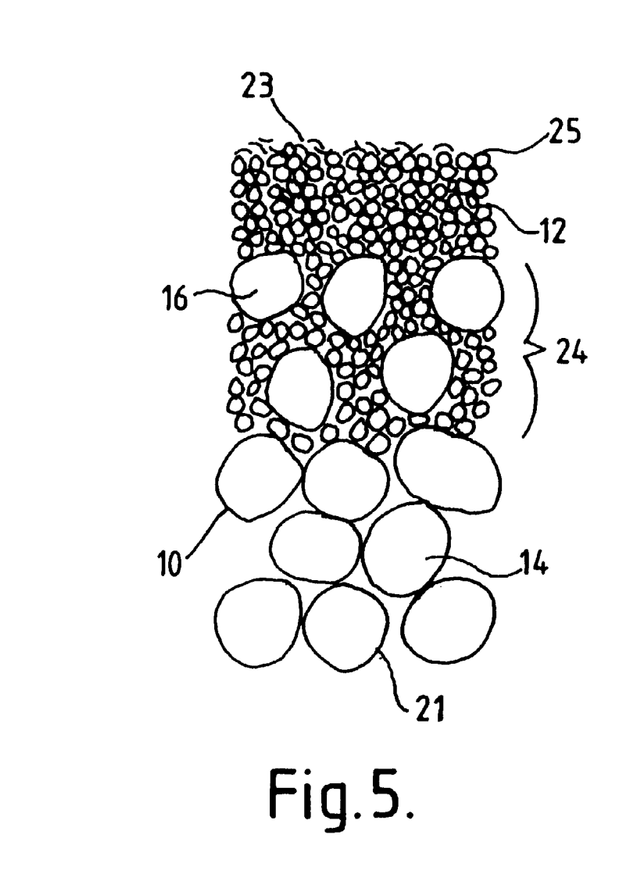
FIG. 5 is an elevation in cross-section of a filter in a third embodiment of the invention.

FIG. 5 shows a third embodiment which also has three layers.

The first layer 12 is a filtration layer. This is made from titanium dioxide ceramic powder although other suitable ceramic powders could be used. The layer 12 may be up to 100 microns thick here being 40 μm, although in another embodiment it may be up to 50 μm thick, preferably being 15 μm thick. The pore size may be 0.2 μm.

There is then an intermediate layer 24 which is a multi-purpose layer, one purpose of which is to provide the extra resistance to gas flow. It is made from a mixture of the powder of the first layer 12 and stainless steel powder. The thickness of this layer may be up to about 50 μm, here being 30 μm and in another embodiment is 15 μm. The pore size is about 0.2 μm.

The final layer 14 is a sintered stainless steel substrate, typically gas-atomised powder or chopped fibre of the same type used in the intermediate layer 24. It may be up to about 250 μm thick, here being 200 μm. The pore size is about 1–2 μm.

The particles of layer 14 are powder rolled and sintered to form the layer 14. The particles of the intermediate layer 24 are then applied and rolled and sintered. Finally the ceramic particles of the layer 12 are applied as a slurry and rolled.

The intermediate layer 24 performs three roles:

The first is to act as a bonding layer. The surface of the second layer 14 is likely to be quite smooth because it is usually made by a form of pressing or rolling process. If the first layer 12 were to be applied to it directly, forces produced by differential thermal contraction on cooling from the high temperature sintering treatment would be concentrated into a small volume of material, and fracture would be likely along this interface. The intermediate layer 24 will have a coefficient of thermal expansion (CTE) intermediate between the other two layers 12,14, so the maximum differential thermal contraction stress will be reduced, and the strained region will have a greater volume reducing the chance of fracture. This is particularly important for ceramics (other than zirconia or ceria, which have unusually high CTE for ceramics). In this way the distance between the surface of metal particles at the top of the intermediate layer and the top of the second layer 14 is greater than the distance between the surface of the metal particles at the top of the intermediate layer 24 and the top of the first layer.

The second role is that the metal particles at the interface between the intermediate layer 24 and the first layer 12 will act as the sites for the generation of hydrogen relatively near the surface of the first layer 12. A typical metal particle 16 may be ~15–20 μm in size. If it protrudes by a third of its diameter from the mean of the top face of the intermediate layer 24, it will penetrate significantly into the first layer 12. It is advantageous for the hydrogen to be generated from a number of such sites with controlled spacing. It is also advantageous if a controlled addition of larger metal particles is added to create hydrogen sources nearer the surface of the first layer 12.

Figure 6:
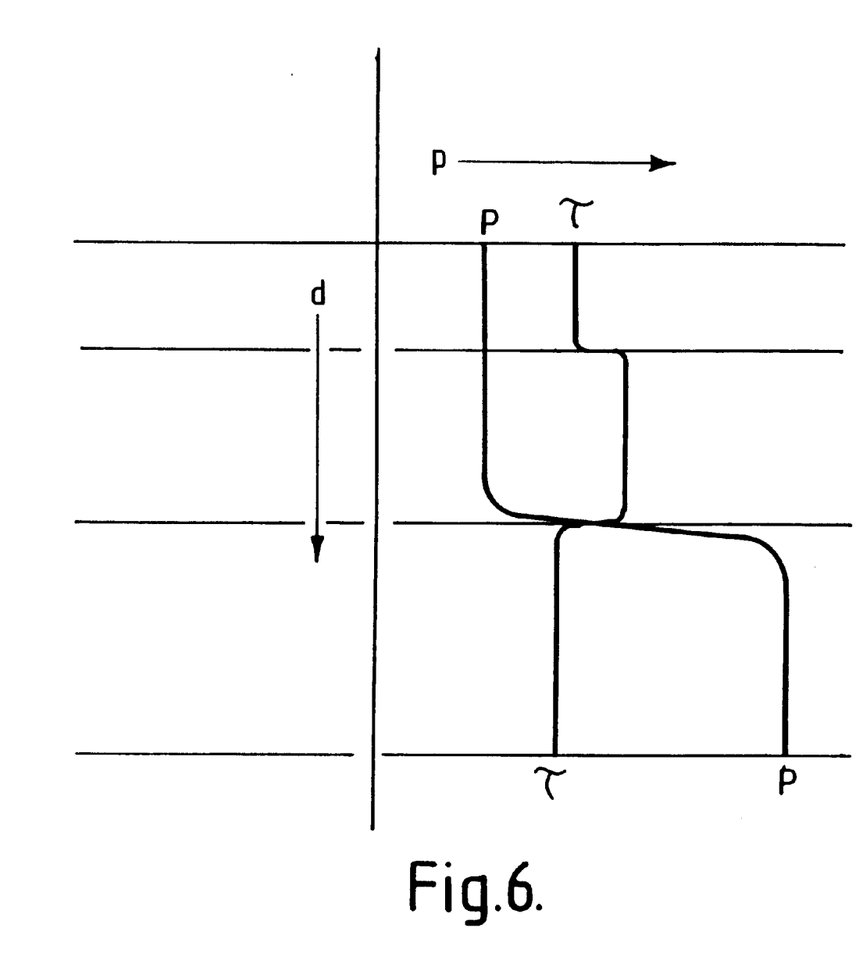
FIG. 6 is a graph of tortuosity and pore size through the depth of the filter of FIG. 5.
Figure 7:
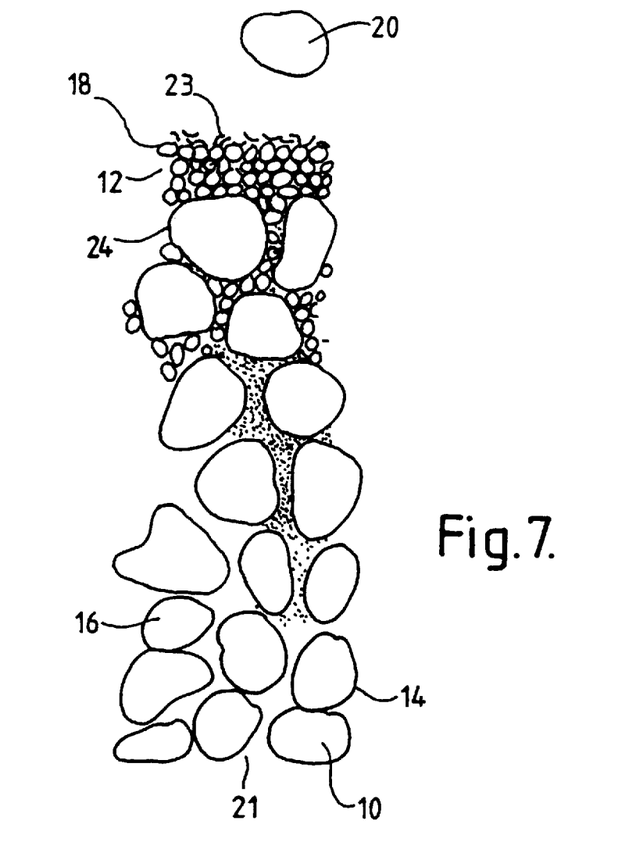
FIG. 7 is a view of FIG. 5 showing bubble distribution.

The third role is that it will act as a barrier to flow of the hydrogen to the downstream surface of the membrane 10 by reducing the volume fraction of voids compared with the first layer 12 and increasing the tortuosity. From the arguments given above it is easy to understand that if the permeation rate for fluid and hydrogen through the intermediate layer 24 is greater, but not by too much, than that through the first layer 12, more of the hydrogen will emerge from the upstream surface, where it is wanted. FIG. 6 shows a graph of pore size P and tortuosity $\tau$ against distance through the filter membrane 10 in parallel with FIG. 5. The pore size in the first layer 12 and intermediate layer 24 is about the same but increases markedly in the second layer 14. The tortuosity is at its highest in the intermediate layer 24. The fact that the tortuosity increases from the first layer 12 into the intermediate layer 24 while the pore size remains the same inhibits the movement of electrolytically generated hydrogen through the intermediate layer 24 towards the downstream side 21 of the filter membrane 10. FIG. 7 shows a typical distribution of bubbles of hydrogen in the filter membrane 10 during cleaning.

The primary purpose of the intermediate layer 24 is to act as a barrier to permeation of the hydrogen generated at the metal particles 16 within it to the second layer 14. To some extent, it will reduce the permeation rate of fluid as well. However, since without the electrolytic cleaning process the permeation rate for fluid is very low anyway, this loss is insignificant compared with the gain elsewhere. Factors important in determining the permeation rate through the intermediate layer 24 will be: volume fraction and size of metal particles 16, volume fraction and size of the ceramic precursor particles 18, and colloid-forming/dispersive additives to the ceramic slurry.

Figure 8:
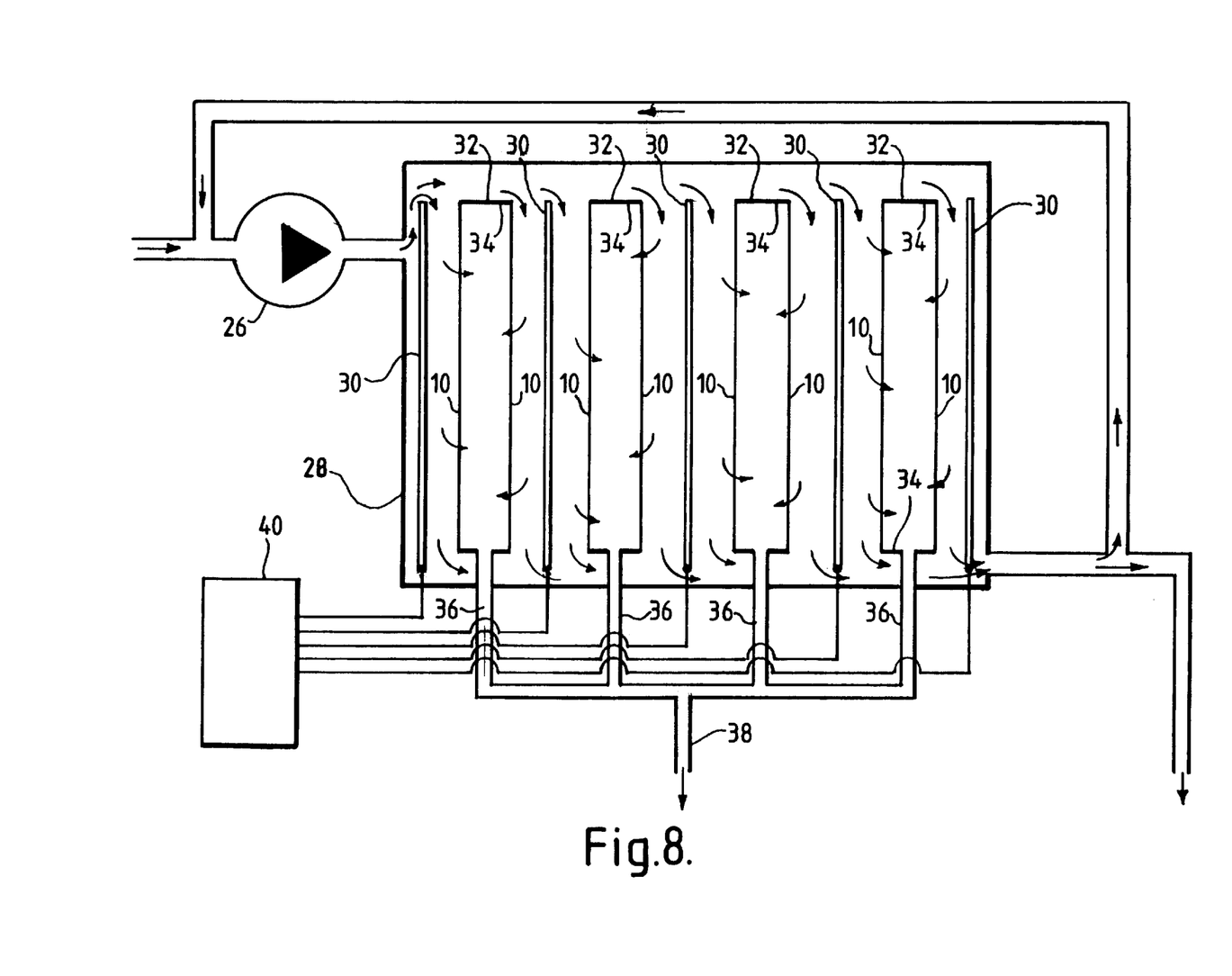
FIG. 8 is a partially schematic view partly in cross-section of apparatus including the filter of FIG. 5.

FIG. 8 shows an embodiment of the apparatus of the invention. Liquid to be filtered is pumped by a pump 26 into a tank 28. In the tank 28 is provided a plurality of parallel equi-spaced anode plates 30. Interleaved with the anode plates 30 is a plurality of filter units 32. Each filter unit 32 comprises two flat filter membranes 10 mounted parallel to the adjacent anode plates 30 by a surrounding framework 34 such that liquid which has been pumped into the tank can only enter a filter unit 32 through a filter membrane 10. Each filter unit 32 includes an output pipe 36 and the output pipes 36 of the filter units 32 combine in a main output pipe 38. A pulse generator 40 is connected to each of the anode plates 30 and also to the filter membranes 10. The spacing of each anode plate 30 from the adjacent filter membrane 10 is about 3 mm and a pulsed current density of about 0.1 A/cm$^2$ is developed by the pulse generator 40. The tank 28 includes an outlet 42 for recycling of liquid. In use, liquid is pumped by the pump 26 into the tank 28. At least some of the liquid is filtered through the filter units 32 and passes out through the pipes 36,38. When a filter cake has built up on the filter membranes 10, the pulse generator 40 is operated to cause hydrogen to be generated within the membranes 10 to clean them as discussed.

Figure 11:
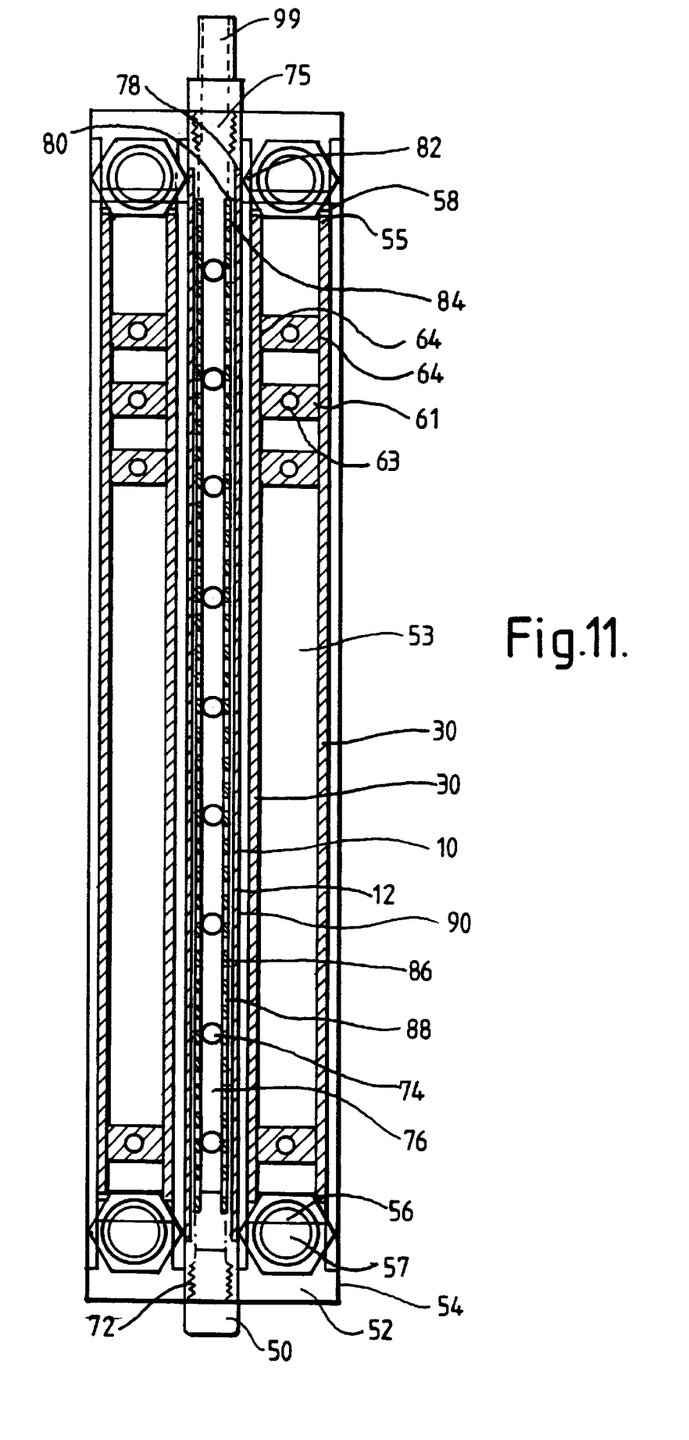
FIG. 11 is a side view in cross-section of two electrode modules and a filter module of apparatus in a further embodiment of the invention.
Figure 12:
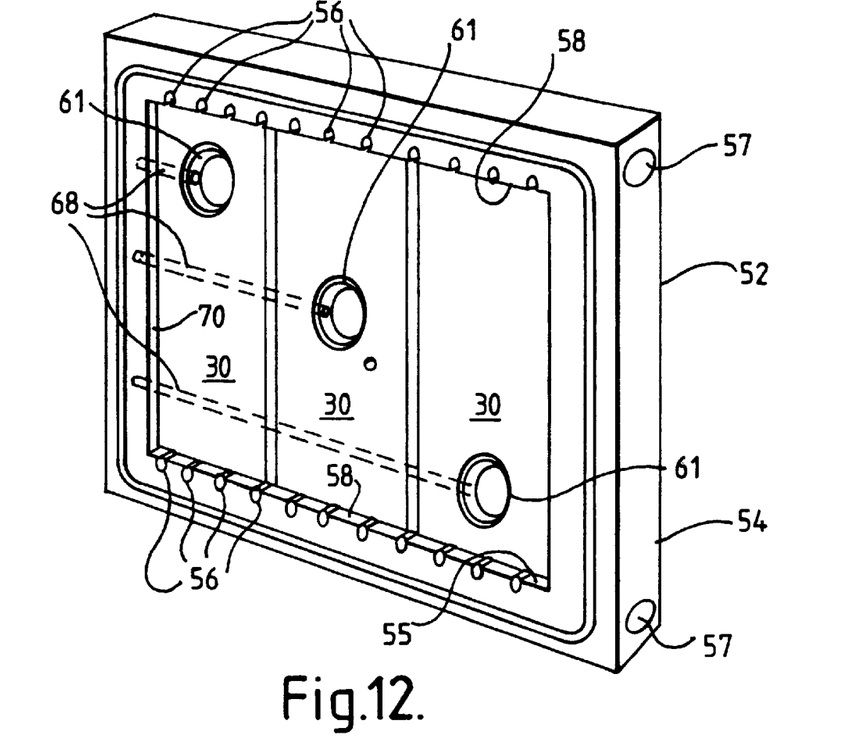
FIG. 12 is a perspective view of an electrode module of FIG. 11.
Figure 13:
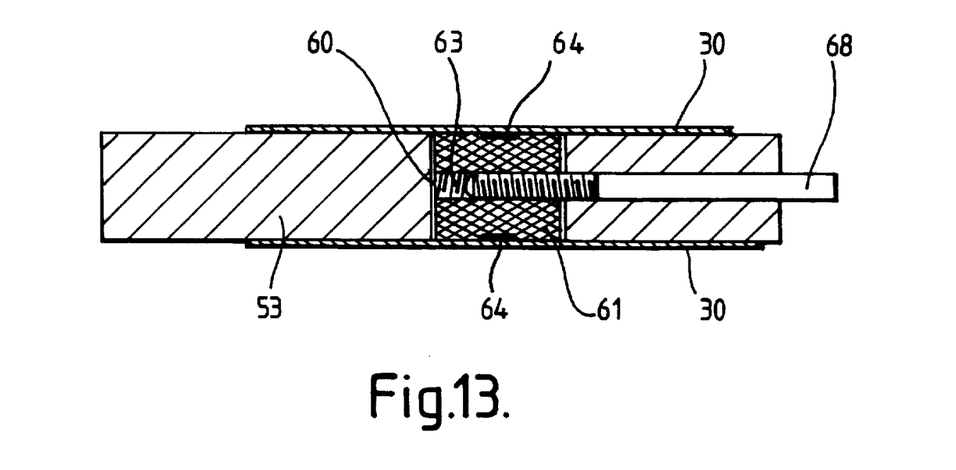
FIG. 13 is a side view in cross-section of a connecting member of the electrode module of FIG. 11.
Figure 14:
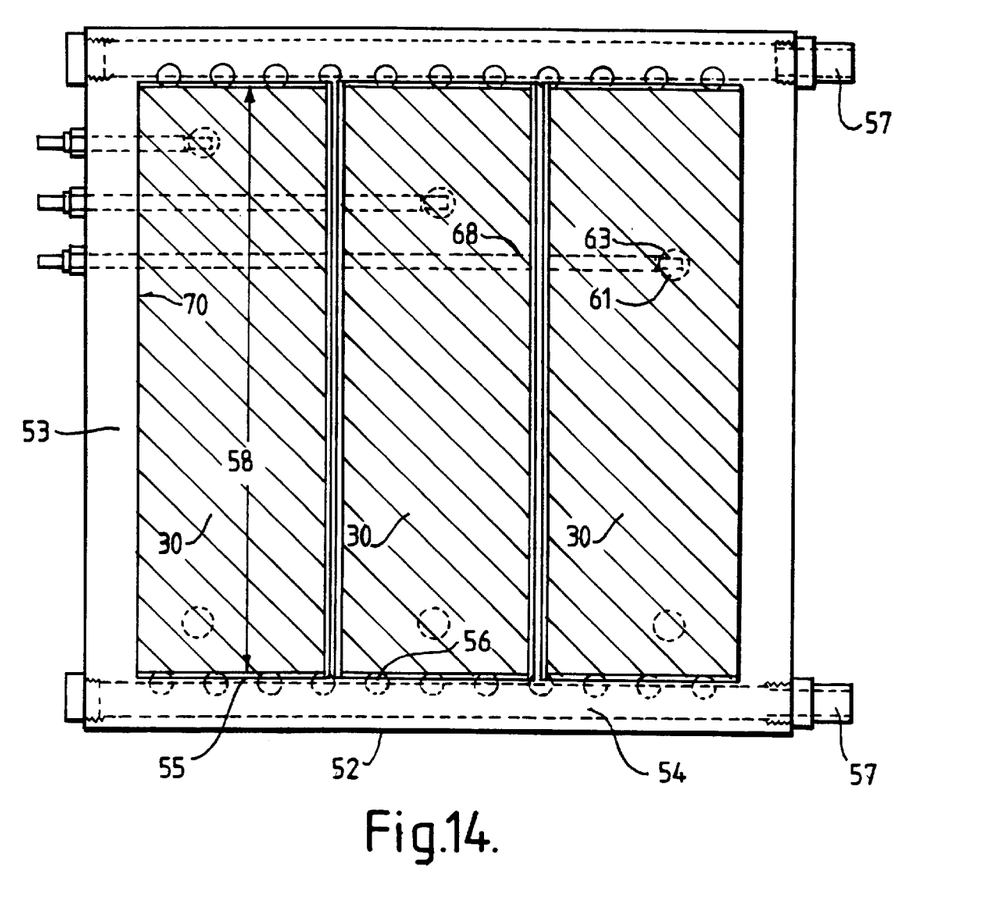
FIG. 14 is a plan view of an electrode module of FIG. 11.

FIG. 11 shows a further embodiment of the apparatus of the invention, this time in modular form. The pump 26 and generator 40 are not shown. The apparatus consists of filter modules 50 and electrode modules 52.

Each electrode module 52 consists of a body 53 having a square frame 54 made from square section material such as polypropylene. The material should be a good insulator, chemically inert for the process application, and thermally stable for the process temperature. In another embodiment it could be PVC, for example. The body 53 is recessed each side providing recesses 55 and includes twelve circular apertures 56 drilled through the body 53 at each of two opposite inner side edges 58 of the frames 54. The circular apertures 56 intersect bores 57 through two sides of the frame 54. Anode plates 30 are mounted in each recess 55 between the inner side edges 58. Three anode plates 30 are provided in substantially co-planar fashion, each anode plate 30 extending from one inner side edge 58 to the opposite inner side edge 58 so that the plates 30 are edge to edge. A further three plates 30 are arranged in the same way in the other recess 55 behind the first three plates 30 and parallel to them to form aligned pairs. A connecting member 61 is provided between each pair of plates 30 in an aperture in the body 53 and is resistance welded 64 to each plate 30. Each connecting member 61 is in the form of a steel disc and defines a radial, threaded bore 63 to receive a threaded end of an anode rod 68. Each anode rod 68 extends through a bore in the body 53 to the side 70 of the frame 54 and through the side 70 of the frame 54 where it is connected to a bus bar. A seal may be provided where the rod 68 leaves the body 53. The ends of the bores 57 form an inlet and an outlet for the module 52 at each corner of the frame 54.

Figure 15:
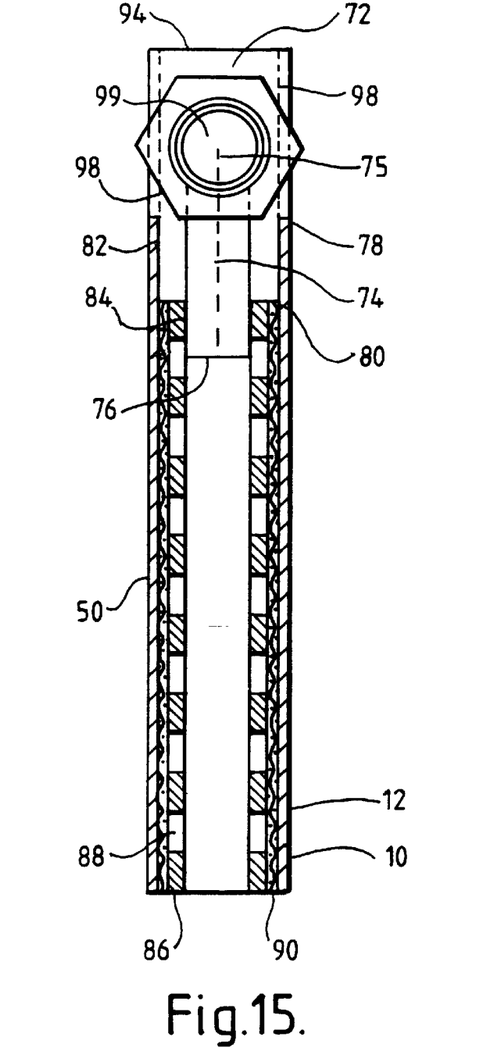
FIG. 15 is a detail side view in cross-section of one end of the filter module of FIG. 11.
Figure 16:
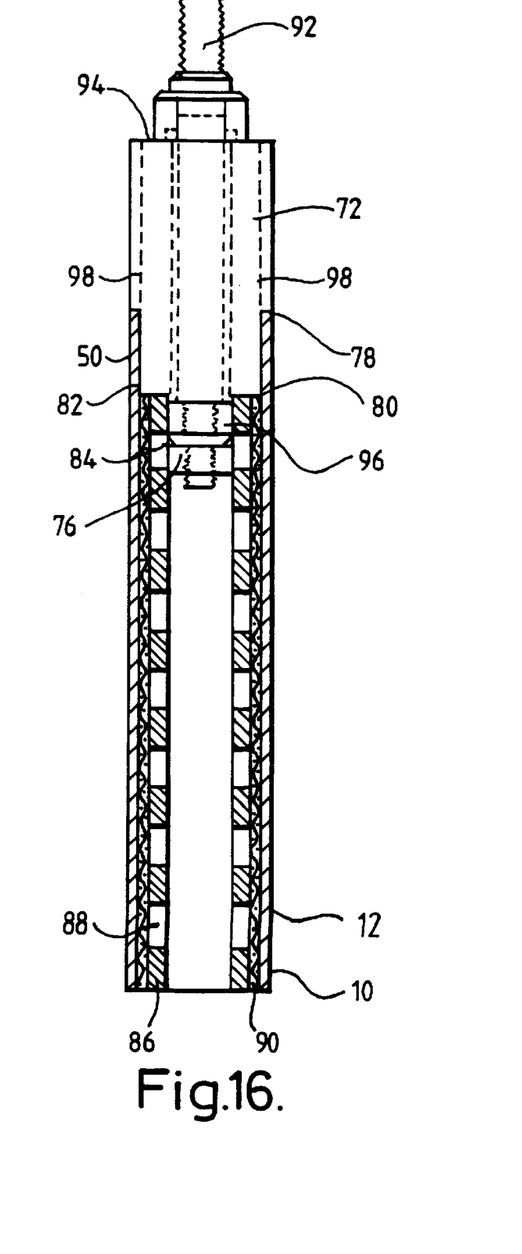
FIG. 16 is a detail side view in cross-section of another end of the filter module of FIG. 11; and, FIG. 17 is a perspective view of apparatus in a further embodiment.

Each filter module 50 also comprises a frame 72. The frame 72 is narrower than the electrode module frame 54. It is of the same outer dimensions in plan. The frame 72 includes nine drilled apertures 74 in an inner side edge 76. The apertures 74 intersect a bore 75 through the frame 72 the end of which at a corner of the frame 72 acts as an outlet 99. Two shoulders 78,80 are formed in each side face of the frame 72 to form rebates 82,84. The first rebate 82 receives the filter membrane 10 of one of the previous embodiments. The ceramic particle layer 12 faces outwards. The second rebate receives a stainless steel sheet 86 which has relatively large circular perforations 88. Between the steel sheet 86 and the filter membrane 10 is provided a steel gauze 90 in the rebate 84. In contact with and extending between the two steel perforated sheets 86 of each module 50 is a corrugated sheet (not shown) in which the corrugations run towards the apertures 74 to permit filtered liquid flow in that direction. To the opposite side of the frame 72 from the apertures 74, a cathode rod 92 extends through the frame 72 from the outer edge 94 to the inner edge 76. A U-shaped connector 96 is bolted to the end of the cathode rod 92 so as to lie in contact with the perforated sheets 86. The U-shaped connector 96 lies in a recess in the frame 72. The cathode rod 92 is sealed on the outer edge 94 and connected to a further bus bar. A shallow groove 98 is provided on each side of the frame 72 from the rebate 82 to the outer edge 94 of the frame 72.

In use, a plurality of the filter modules 50 and electrode modules 52 are arranged alternately side by side with an electrode module at each end of the row. A clamping plate is placed over either end and the clamping plates are connected by tie rods (not shown). The frames 52,72 are thus held together in a substantially fluid tight manner. In a series mode for the system the outlets 99 from the filter modules 72 are connected together to a common take-off line (not shown) and the outlets 59 from the electrode module 52 at one end of the apparatus is connected to the inlet 57 to the next module 52 and so on to the final electrode module 52 which includes a valve (not shown) at its outlet 59. In all cases liquid to be filtered is pumped through the inlet 57 to the first electrode module 52 and passes through the frame 54 into the area adjacent the filter membrane 10. Filtered liquid passes through the openings in the gauze 90 and through the perforated apertures 88 in the sheet 86 into the folds of the corrugated sheet in the central opening of the filter module 72. The filtered liquid passes through the apertures 74 in the frame 72 and out through the outlet 99. If a leak should arise on either side of the filter membrane 10, rather than passing along the floor of the rebate 82 and into the central opening of the filter module 72, the leak will flow preferentially along the shallow channel 98 to atmosphere as this will represent a greater pressure drop.

The use of a plurality of relatively thin electrode plates has enabled the use of a relatively low current to evolve hydrogen in the filter membrane 10 to clean filter cake from it. Indeed, with each anode plate being say 10 cm by 30 cm, the mains supply can be used for each plate to produce a suitable current density.

In a dead end series mode for the system, liquid to be filtered enters the inlet 57 of the first anode module 52. Liquid from its outlet 59 then enters the inlet 59 of the second module and so on up to the last module. In use, the particulates that form the filter cake are progressively concentrated by fluid flow into the last anode module 52. By use of a solenoid valve (not shown) it is possible periodically or continuously to discharge this highly concentrated material from the outlet 59 of the last anode module 52.

This is more efficient than systems where the entire apparatus must be washed through to remove filter cake, as a concentrated accumulation of filter cake can be removed with minimal loss of liquid.

The apparatus described when used in this dead end mode can be used for filtration of a suspension of disrupted bacteria which have been genetically manipulated to produce a required material such as a drug. The drug will pass through the filter, while the cell bodies of the bacteria will not pass through the filter membranes 10. This biotechnological technique is expensive and it is important to minimise the loss of the drug by minimising the loss of liquid in the filtering process.

The apparatus can also be re-arranged for use in cross flow mode, and in that case all of the inlets 57 of the anode modules 52 may be connected to a common inlet manifold (not shown). Also all of the outlets 59 of the anode modules may be connected to a common outlet manifold (not shown). Part of the fluid from the common outlet manifold may be drained through a control valve (not shown), the rest being passed through the re-circulation pump. It is also possible to operate the system in cross flow mode yet with sets of anode modules 52 connected in series such that the outlet 59 of the first such module is connected to the inlet 57 of the second module and perhaps repeated for a plurality of other anode modules, yet the output 59 of the final anode module in the set shall be connected along with the final output of other module sets for a common manifold for splitting into drain and recycle. The velocity of the liquid entering the electrode modules 52 is controlled to provide either laminar flow, which will minimise power consumption, or turbulent flow, which may result in some cleaning of the filter by the turbulent liquid movement.

In a further embodiment, a bimodal particle size distribution is used in the metal particles 16 to be used in the intermediate layer 24. A controlled number of larger particles 16 of diameter about 25 μm are provided and will penetrate well into the first layer 12 to ensure that the hydrogen is generated as near to the surface of that layer as possible, and with an optimum spacing to clear the filter cake as quickly as possible with minimum power consumption and consequent reduced heating effect. This will ensure that the resistance to fluid/gas flow through the intermediate layer 24 can be kept low enough that it will not reduce the performance of the overall system significantly.

Figure 9:
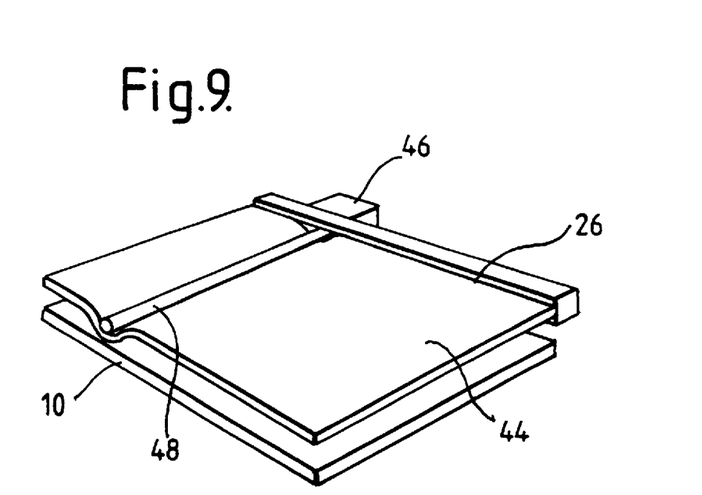
FIG. 9 is a perspective view of apparatus in a fourth embodiment of the invention.

As an alternative to the elongate electrode 20 and the anode plates 30, a flexible conductive sheet 44 may be used in parallel with a filter membrane 10 as shown in FIG. 9. A motor 46 pushes a rod 48 across the resilient sheet to create a wave. The anode cathode gap is about 3 mm and the wave amplitude is about 1.5 mm. In this case a constant potential is applied between the sheet 44 and filter membrane 10 and the waves transmitted across the sheet 44 provide the cleaning effect serially across the membrane 10.

Figure 17:
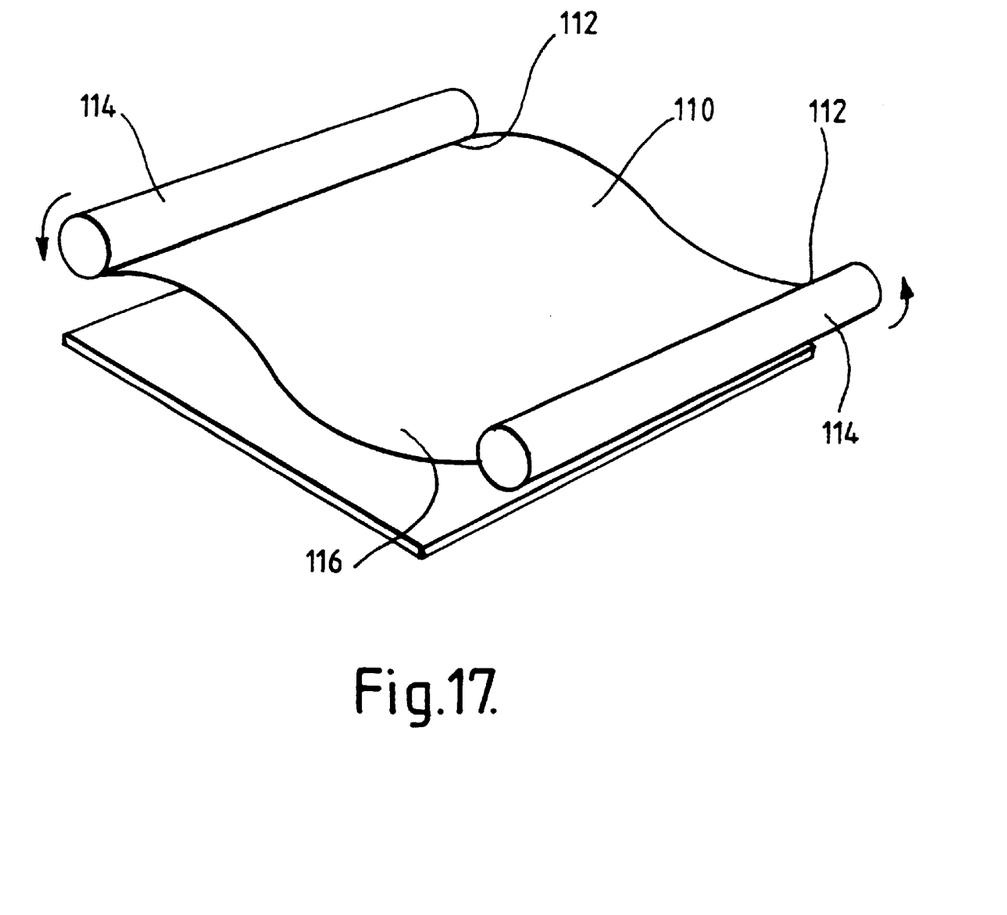

FIG. 17 shows a further alternative arrangement. Here a sheet 110 of 0.5 mm thickness stainless steel is used as the anode. Opposite edges 112 of the sheet 110 are connected along their length to two rods 114. Each rod 114 is partly rotatable by a motor (not shown). Partial rotation of the rods 114 clockwise and anti-clockwise will cause a wave to be transmitted across the relatively stiff sheet. The trough 116 of the wave will be close to the layer 14 constituting the cathode of the system and the separation between the sheet 110 and filter 10 will be such as to ensure that a good rate of hydrogen production results opposite the trough 116 in the sheet 110, while little or no hydrogen production takes place opposite the remainder of the sheet 110. In this way lower power can be used and the filter 10 can be cleaned in a sweeping motion of the trough 116/wave across the sheet 110.

At the same time as electrolytic cleaning is taking place, back pressure of fluid may also be used in the known manner. In addition the filter may be vibrated, for example, by a piezo-electric transducer to further assist in cleaning. The back pressure may be in phase with the application of power pulses where used.

The filter membrane 10 shown in FIG. 1 can be treated to provide an intermediate layer in a number of ways. The electrolyte used for hydrogen evolution at the interface may be replaced by a suitable electrolyte for the deposition of a conductive material on the stainless steel particles 16 at the interface. The electrolyte may be an aqueous nickel-tin sulphate solution, here being 60 gl$^{-1}$ stannous sulphate $SnSO_4$ plus 60 gl$^{-1}$ nickel sulphate $NiSO_4 6H_2O$ plus 70 ml/1 concentrated sulphuric acid which will electroplate a nickel-tin. Other suitable materials to be deposited could be a nickel alone, tin alone, cobalt, gold or platinum. It is convenient to electroplate from an aqueous solution which requires that the metal to be electroplated must be deposited in preference to hydrogen. To deposit nickel alone the above process can be used with the omission of the stannous sulphate.

The nickel-tin intermetallic will be deposited and will in certain circumstances form a dendritic structure penetrating into the first layer of ceramic particles 18. The dendritic structure will bond the layers 12,14 together more closely and will provide an intermediate layer of electrodeposited metal dendrites and ceramic particles 18. This serves two purposes. The first is to generate hydrogen nearer the upstream surface. The second is to provide a layer of increased resistance to flow of evolved hydrogen to the downstream surface so that evolved hydrogen will reach the upstream surface 25 of the membrane 10 before the downstream surface.

If hydrogen gas is generated electrochemically, its pressure, hence chemical activity can be high enough directly to reduce some metal salts to metal, as is well known in hydrometallurgy. This process may also be used in precipitate metal in the first ceramic layer 12. Other electroless plating methods may also be used.

The layer structure of the initial material of the embodiment of FIG. 1 is formed by rolling a stainless steel powder and partially sintering it to provide a flat metal layer in green state. The titanium dioxide layer is then applied as a particle slurry to one surface. As discussed, the powder rolled surface of the sintered material provides a flat interface which leads to the concentration of thermal contraction stresses which can lead to delamination. The structure may thus be fragile and liable to delaminate under its desired usage. The electrodeposited material not only provides the required interlayer of increased resistance to ensure that the membrane 10 can be cleaned by evolution of gas, but may also operate to improve the resistance to mechanical failure of the filter. The ductile electroplated metal may increase the work of fracture of the ceramic body. The electrodeposited material may be added such as to reduce the porosity of the first layer at the interface by 0.1 to 50%.

Figure 10:
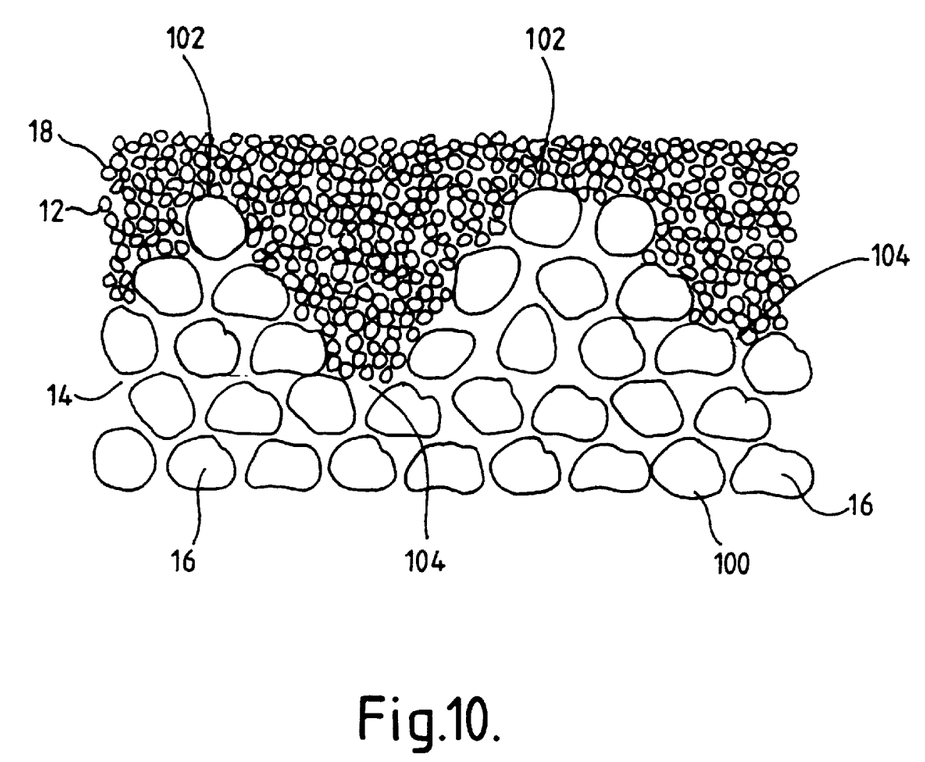
FIG. 10 is an elevation in cross-section of an intermediate stage in manufacture of a filter according to a fifth embodiment of the invention.

FIG. 10 shows a further membrane structure 100. In this case, to avoid the thermal contraction stresses delaminating the layers 12,14, once the stainless steel powder layer 14 has been rolled and partially sintered, a slurry of stainless steel particles 16 is applied to its surface and heated to provide an irregular and less closely packed adherence of stainless steel particles to the surface of the flat, rolled initial layer. This creates a surface which includes peaks 102 and troughs 104 on the microscale. The titanium dioxide particles 18 are then added as a slurry and fill the troughs 104. The tendency to delamination due to thermal contraction stresses is reduced for this structure 100. If the method described for the creation of an intermediate layer in the filter of FIG. 1 is used, then the electrodeposition of the tin-nickel intermetallic will take place on the peaks 102 of the stainless steel particle layer 14 preferentially to the troughs 104. Any gaps in coverage by the ceramic particles due to faults in manufacture will be ameliorated by the deposition which will tend to fill in the gaps. The gaps may be caused by skin particles or hairs, for example. If the distance between peaks is too great it is possible that some areas of the membrane might not be cleaned effectively. Good results in cleaning are obtained with isolated particles or particle clusters i.e. peaks 102 provided at a density of 50 to 2500 mm$^{-2}$. At over 150 mm$^{-2}$ the peaks 102 are close enough that during cleaning few or no areas of the membrane are not cleaned by $H_1$ evolution. Alternatively or in addition an aqueous bright electroplating electrolyte containing, for example 30 gl$^{-1}$ potassium stannate plus 30 ml/l concentrated sulphuric acid can be used to cause more even electroplating. The concentration gradient of metal ions which results in a dendritic growth is reduced by this method and so a more even electroplating upon the interface between the layers 12,14 is achieved.

An alternative way to provide the desired textured surface is to roll the sintered metal particles using a textured roller before the ceramic particles are added. Suitable laser scribed rollers are know which can texture on a micrometre scale. This gives very good control of the texture so that no two "peaks" are too far apart which can occur with the applied slurry method. The rolling could also take place during sintering to further reduce manufacturing time.

The $TiO_2$ particles could be replaced by $Ti_4O_7$ particles or reduced to that composition. $Ti_4O_7$ has a conductivity of about 3000 $\Omega^{-1}$cm which is close to that of the metals. This will raise the surface of evolution of the hydrogen away from the interface between the ceramic and metal particle layers and can be used to ensure that the hydrogen reaches the upstream surface of the membrane first. $TiO_2$ particles can be reduced by heating to 1200° C. in hydrogen. To improve production the final sintering of the filter could take place in a hydrogen enriched atmosphere to combine the sintering and reduction processes.

Alternatively very small metal particles could be used to raise conductivity, but the only metal likely to be sufficiently chemically stable are the precious metals gold and platinum which are expensive.

Another higher conductively ceramic such as $LaCr_{0.9}Mg_{0.1}O_3$ could be used (B.C.H. Steele; Kendall et al; Proceeding of the Conference "Advanced Ceramics in Chemical Process Engineering" Imperial College London Dec. 19–20 1988 pp 163–172 published by the Institute of Ceramics.

What is claimed is:

1. A filter comprising a first electrically conductive filter layer and a second electrically conductive filter layer downstream of the first layer, the first layer being less conductive than said second layer and having a smaller pore size than the second layer, said filter further comprising an electrically conductive intermediate layer between the first and second filter layers, the intermediate layer being more conductive than the first layer and having a resistance to movement therethrough of electrolytically generated gas when the filter is permeated with liquid, said resistance being of no less magnitude than that of the first layer so that said gas reaches the upstream side of the filter before said gas reaches the downstream side, the porosity of the said intermediate layer being at least 0.1% lower than that of the first layer.

2. A filter as claimed in claim 1, wherein the intermediate layer has a porosity which is not more than 50% of porosity of the first layer.

3. A filter as claimed in claim 1, wherein the intermediate layer comprises a composite of materials some of which are more electrically conductive than others.

4. A filter as claimed in claim 3, wherein the volume fraction of the more electrically conductive materials in the intermediate layer is highest adjacent the second layer.

5. A filter as claimed in claim 3, wherein the more electrically conductive material of the intermediate layer is the same material as that of the second layer.

6. A filter as claimed in claim 3, wherein the less electrically conductive material of the intermediate layer is the same less electrically conductive material as that of the first layer.

7. A filter as claimed in any of claims 1 and 2–6, wherein the intermediate layer comprises a composite of particles some of which are larger than others.

8. A filter as claimed in claim 7, wherein the larger particles are made from material more electrically conductive than that from which the smaller particles are made.

9. A filter as claimed in claim 7, wherein the more conductive particles are present in the form of isolated particles or clusters of particles in the range 50 to 2500 isolated particles and clusters per square millimetre of the intermediate layer in plan.

10. A filter as claimed in claim 7, wherein the more conductive particles are present in the form of isolated particles or clusters in the range 100 to 2500 isolated particles and clusters per square millimetre of the intermediate layer in plan.

11. A filter as claimed in claim 7, wherein the more conductive particles are present in the form of isolated particles or clusters in the range 250 to 2500 isolated particles and clusters per square millimetre of the intermediate layer in plan.

12. A filter as claimed in claim 3, wherein the intermediate layer comprises particles in a porous matrix.

13. A filter as claimed in claim 12, wherein the particles of the first filter layer are less electrically conductive than the matrix.

14. A filter comprising a first electrically conductive filter layer and a second electrically conductive filter layer downstream of the first layer, the first layer being less conductive than the second layer and the first layer having a smaller pore size than the second layer, said filter having a further layer downstream of the second layer with a resistance to movement therethrough of electrically generated gas when the filter is permeated with liquid, said resistance being greater than the resistance to movement of electrically generated gas through the second layer whereby said gas will pass to the upstream side of the filter before the downstream side.

15. A filter as claimed in claim 14, wherein the further layer is made from the same material as the first layer.

16. A filter as claimed in claim 1, wherein the pore size of the first layer is no more than 10.

17. A filter as claimed in claim 1, wherein the pore size of the first layer is no more than 2.5.

18. A filter as claimed in claim 1, wherein the pore size of the first layer is no more than 1.0.

19. A filter as claimed in claim 1, wherein the pore size of the first layer is no more than 0.5.

20. A filter as claimed in claim 1, wherein the first layer has a pore size sufficient to reject bacteria.

21. A filter as claimed in claim 1, wherein the first layer is made of ceramic.

22. A filter as claimed in claim 21 wherein the first layer is made of titanium dioxide.

23. A filter as claimed in claim 21, wherein the ceramic is $Ti_4O_7$.

24. A filter as claimed in claim 1, wherein the second layer is made of a material which is an electrical conductor.

25. A filter as claimed in claim 1, wherein the second layer is made of metal.

26. A filter as claimed in claim 25, wherein the second layer is made of stainless steel.

27. Apparatus comprising a filter as claimed in claim 1 and an opposite electrode to enable electrolysis with the fitter acting as a further electrode.

28. Apparatus comprising a filter as claimed in claim 14, and an opposite electrode to enable electrolysis with the filter acting as a further electrode.

29. Apparatus as claimed in claim 27, wherein the apparatus further includes electrical pulse means to provide pulsed power to the electrodes.

30. Apparatus as claimed in claim 27, wherein the electrode comprises a plate or mesh to be arranged parallel to the filter surface.

31. Apparatus as claimed in claim 27, wherein the opposite electrode is arranged to apply a potential difference to parts of the filter sequentially.

32. Apparatus as claimed in claim 27, wherein the filter apparatus comprises a plurality of filter modules and a plurality of electrode modules, each filter module including the said filter with the more conductive layer being connected to an electrical supply, each electrode module comprising the said opposite electrode, each module being bounded by a frame, the filter and electrode modules being arranged alternately side by side and the frames secured together in a substantially liquid tight manner.

33. Apparatus as claimed in claim 27, wherein each electrode module comprises a plurality of electrode plates.

34. Apparatus as claimed in claim 31, wherein each electrode plate is 250 to 400 $cm^2$ in area.

35. Apparatus as claimed in claim 34, wherein in each electrode module a plurality of electrode plates is arranged in substantially co-planar manner.

36. A method of cleaning a filter using apparatus according to claim 27, the method comprising applying potential across the electrodes.

37. A method as claimed in claim 36, wherein no back pressure is applied across the filter during cleaning.

38. A filter as claimed in claim 1, wherein the difference in conductivity between the layers is sufficiently small that the surface of electrolytic gas evolution is within the first layer.

* * * * *